US006617041B2

(12) United States Patent
Hahn et al.

(10) Patent No.: US 6,617,041 B2
(45) Date of Patent: Sep. 9, 2003

(54) CORROSION PROTECTIVE COATINGS

(75) Inventors: John Hahn, Columbia, MO (US); Robert L. Heimann, Moberly, MO (US); Daniel I. Crosby, Hallsville, MO (US)

(73) Assignee: Elisha Holding LLC, Moberly, MO (US)

( * ) Notice: Subject to any disclaimer, the term of this patent is extended or adjusted under 35 U.S.C. 154(b) by 0 days.

(21) Appl. No.: 10/016,388

(22) Filed: Dec. 10, 2001

(65) Prior Publication Data
US 2002/0078856 A1 Jun. 27, 2002

Related U.S. Application Data

(63) Continuation of application No. 09/016,849, filed on Jan. 30, 1998.
(60) Provisional application No. 60/045,386, filed on May 2, 1997, and provisional application No. 60/036,026, filed on Jan. 31, 1997.

(51) Int. Cl.⁷ .............................. C09L 3/00; C23F 11/10
(52) U.S. Cl. .................. 428/450; 428/462; 252/388; 252/389.3; 106/14.22; 106/14.25; 106/14.26; 106/14.34

(58) Field of Search ................... 428/467, 459, 428/462, 446, 450; 252/388, 389.3, 396; 106/14.22, 14.25, 14.26, 14.34

(56) References Cited

U.S. PATENT DOCUMENTS

| 3,816,310 A | * | 6/1974 | Hunt ..................... 252/32.7 |
| 4,957,641 A | * | 9/1990 | Borggrefe et al. ............. 252/34 |
| 5,310,496 A | * | 5/1994 | Taylor ..................... 510/212 |
| 5,534,173 A | * | 7/1996 | Faber et al. ................ 252/49.6 |
| 5,714,093 A | * | 2/1998 | Heimann et al. ....... 252/389.62 |
| 5,726,140 A | * | 3/1998 | Distaso ..................... 510/207 |

FOREIGN PATENT DOCUMENTS

EP          0176018 A   *   4/1986

* cited by examiner

*Primary Examiner*—Deborah Jones
*Assistant Examiner*—Stephen Stein
(74) *Attorney, Agent, or Firm*—Michael K. Boyer

(57) ABSTRACT

The disclosure relates to temporary corrosion resistant coatings and films upon metal substrates, e.g., metal tools and dies. The temporary coatings and films will not adversely chemically alter the surface of the underlying substrate. The coatings/films comprise a mixture of at least one of an acrylic, water, an oil, silica, at least one silicate, surfactants and optionally one or more buffering materials and waxes.

22 Claims, No Drawings

CORROSION PROTECTIVE COATINGS

This application is a continuation of application Ser. No. 09/016,849, filed Jan. 30, 1998, which claims benefit under 35 U.S.C. 111(a), 35 U.S.C. 119(e) and 35 U.S.C. 120 of U.S. Provisional Patent Application Ser. No. 60/045,386, filed on May 2, 1997; and U.S. Provisional Patent Application Ser. No. 60/036,026, filed on Jan. 31, 1997 both of which are entitled "Corrosion Protective Coating". The disclosure of the aforementioned Provisional Patent Applications is hereby incorporated by reference.

FIELD OF THE INVENTION

The instant invention relates to temporary corrosion resistant coatings and films upon metal substrates, e.g., metal tools and dies. The temporary coatings and films will not adversely chemically alter the surface of the underlying substrate. The coatings/films can comprise a mixture of at least one of an acrylic, glycerin, water, an oil, e.g., vegetable such as canola, linseed and castor, synthetic oils such as polyalphaolefin (PAO), polybutenes, polyglycol, silicone, and phosphate esters; naturally occurring oils such as mineral oil, mixtures thereof, among others; silica, at least one silicate, surfactants and optionally one or more buffering materials and waxes.

BACKGROUND OF THE INVENTION

The corrosion of steel and other metal containing products continues to be a serious technical problem which has profound effects on the economy. Corrosion causes loss of natural resources, and deteriorates key infrastructure such as roads and buildings. It also causes premature replacement of equipment and parts in industrial facilities, boats and other marine vehicles, automobiles, aircraft, among a wide range of metallic components.

Current industry standards for corrosion prevention center around the use of barrier coatings, sacrificial coatings, alloys containing heavy metals such as chromium, nickel, lead, cadmium, copper, mercury, barium, among other heavy metals. Conventional coatings can also include volatile organic compounds (V.O.C.s) or solvents such those disclosed in U.S. Pat. No. 4,631,083 (Dec. 23, 1986 to Christhilf); hereby incorporated by reference. The introduction of these materials into the environment, however, can lead to serious health consequences as well as substantial costs to contain or separate the materials or clean up environmental contamination. Damage associated with corrosion, accordingly, is a continuing problem and better systems for preventing corrosion are still needed.

In many applications, metal articles which are used as tool steels, particularly in steel cutting tools, injection molding, e.g., plastic shaping, dies, e.g., extrusion dies, molds, e.g., for shaping polymers, glass, nylon, among other materials; become corroded while being stored. Conventional corrosion protection methods adversely impact the performance of the underlying metal article and suffer from undesirable environmental characteristics.

SUMMARY OF THE INVENTION

The instant invention solves problems associated with conventional methods for protecting metal containing surfaces by providing a temporary metal coating/film which protects the metal surface from corrosion, and is cost-effective, typically non-toxic and non-flammable. By temporary it is meant that in typically end-uses the coating protects the metal surface for a period of less than about 6 months, or longer depending upon the environment to which the metal is exposed. The inventive coating/film can also obviate using heavy metals such as chromium for corrosion protection. The inventive coating, however, can enhance the corrosion resistance of chrome-containing alloys.

The inventive coating/film comprises or consists essentially of at least one member from the group of a carrier such an acrylic, glycerin, water, an oil, e.g., vegetable such as canola, linseed and castor, synthetic oils such as polyalphaolefin (PAO), polybutenes, polyglycols, silicone and phosphate esters, naturally occurring oils such as mineral oil, mixtures thereof, among others; silica, at least one silicate, surfactants and an optional buffering material and optionally at least one wax. Suitable acrylics for the carrier include polymers formed from acrylic acid, methacrylic acid and their esters, e.g., methyl-methacrylate, and combinations thereof. While the inventive coating/film is desirable in that solvents, e.g., (V.O.C.s), are unnecessary, the presence of a suitable solvent does not adversely effect the utility of the inventive coating/film and if desired hydrocarbons can be employed as propellants to apply the inventive composition. The inventive coating can be applied in any expedient manner such as painting, dipping, spraying, e.g., an aerosol spray, among other application methods. If desired, the coating/film can be removed from the metal surface by washing with a suitable surfactant, or dry-wiped in the case of a self-supporting film by being stripped from the underlying surface, e.g, the self-supporting film may be removed by a plastic molding process.

In general, the carrier provides a coating or layer to cover the surface to be protected; provides a dispersion medium for the corrosion inhibitor, and provides a physical barrier to inhibit corrosive materials from reaching the surface. The suitable carrier materials include materials which yield self-supporting films, such as acrylic-based carriers and oxidizable carriers and those which do not produce self-supporting films as in the case of many oil-based carriers. By self-supporting film, it is meant that the carrier, after drying or curing, produces a material that can be stripped or peeled from the substrate as a film or as sections of film.

In one aspect of the invention, the inventive coating/film forming composition comprises an acrylic based material. When employing an acrylic based composition, a strippable self-supporting coating/film can form upon the surface of the underlying metal. That is, the acrylic based composition can be applied upon a metal surface, allowed to dry (or cure), and removed when desired by peeling or stripping the self-supporting film from the surface of the metal.

In another aspect of the invention, the inventive coating/film forming composition comprises a composition based upon an oil such as vegetable, canola, linseed, mineral, PAO, mixtures thereof, among others. The oil can function as a vehicle for delivering at least one of silica and/or silicate, among other compounds, as well as a physical barrier for protecting the underlying metal surface, e.g., from humidity.

In a further aspect of the invention, the inventive coating/film forming composition comprises an oxidizable carrier. By "oxidizable" carrier, it is meant that a carrier such as a naturally occurring oil is crosslinked and converted after being applied upon the metal surface. For example, in the case of a cedar or linseed oil carrier, the carrier can become at least partially cross-linked thereby forming a coating/film which is relatively dense and self-supporting. In some cases, at least a portion of the coating/film underlying the oxidized surface remains in an uncured state. Depending upon the characteristics of the oxidizable carrier and the surrounding environment, such a carrier can provide improved physical resistance to corrosion such as water repellence (in addition to the affects of a silica or silicate containing compound).

CROSS-REFERENCE TO RELATED PATENTS AND PATENT APPLICATIONS

The subject matter of the instant invention is related to copending and commonly assigned Non-Provisional U.S. patent application Ser. Nos. 09/016,853 (Attorney Docket No. EL001RH-8) filed on even date herewith, 08/850,323 and 08/850,586 (Attorney Docket Nos. EL001RH-6 and EL001RH-7) filed on May 2, 1997; and Ser. Nos. 08/791,336 (Attorney Docket No. EL001RH-5) and 08/791,337 (Attorney Docket No. EL001RH-4) filed on Jan. 31, 1997 in the names of Robert L. Heimann et al., as a continuation in part of Ser. No. 08/634,215 (Attorney Docket No. EL001RH-3 filed on Apr. 18, 1996) in the names of Robert L. Heimann et al., and entitled "Corrosion Resistant Buffer System for Metal Products", which is a continuation in part of Non-Provisional U.S patent application Ser. No. 08/476,271 (Attorney Docket No. EL001RH-2 filed on Jun. 7, 1995) in the names of Heimann et al., and corresponding to WIPO Patent Application Publication No. WO 96/12770, which in turn is a continuation in part of Non-Provisional U.S. patent application Ser. No. 08/327,438 (Attorney Docket No. EL001RH-1 filed on Oct. 21, 1994), now allowed.

The disclosure of the previously identified patent applications and publication is hereby incorporated by reference.

DETAILED DESCRIPTION

Metals such as steel inherently respond to the environment by oxidizing. Conventional practice is to apply a protective coating upon a metal tool or die that may include environmentally undesirable solvents and oils, chlorofluorocarbons (CFCs), volatile organic compounds (VOCs), among other undesirable compounds. For example, the plastic injection molding industry utilizes a myriad of oil-based coatings to provide temporary corrosion protection from the environment. Inherent with the conventional oil-based coatings is the process for delivering as well as removing such coatings that typically generates hazardous waste through the use of solvents as well as being time consuming. In addition to protecting metal tools and dies, the inventive coating/film can be employed in a virtually unlimited array of end-uses including protecting gun barrels, conduits from corrosion under insulation; and utilized during metal fabrication or shaping.

The inventive coating/film forming composition comprises or consists essentially of at least one member from the group of an acrylic, water, an oil, silica, at least one silicate, surfactants and an optional buffering materials and waxes. Generally, the coating/film forming compositions will fall into two categories, namely, oil-based and acrylic based carriers. While any suitable oil carrier can be employed, examples of suitable oils comprise at least one member selected from the group consisting of canola, soybean, castor, sunflower, linseed, mixtures thereof, among others. Similarly, examples of acrylic carriers comprise at least one member selected from the group consisting of acrylic acid, methacrylic acid, and their esters, e.g., methyl methacrylate, and combinations thereof, among others. Normally; the carrier will comprise about 80 to about 90 wt. % of the composition. The carrier oil as well as the remainder of the composition can also be non-toxic and/or biodegradable as defined by U.S. Environmental Protection Agency (USEPA) Organization for Economic Cooperation and Development (OECD) or other regulating bodies.

The composition can also include a coupling agent and thickener such as glycerin, xantham gum, Carbopol polymer, mixtures thereof, among others. The coupling agent and/or thickener are generally used to increase the flow resistance of the composition, e.g., obtain a viscosity of about 2,500 to about 5,000 cps. Normally, the coupling agent and thickener will combine to comprise about 0.1 to about 0.5 wt. % of the composition.

A surfactant can be added to the coating/film forming composition such as at least one member from the group of an alcohol, PEMULEN 1621 hydrocarbon emulsifier (supplied by B.F. Goodrich), mixtures thereof, among other suitable surfactants that do not adversely impact the solubility characteristics of the carrier within water. For example, when an alcohol is employed, the alcohol can form an azeotropic compound with water thereby increasing the curing or drying rate of the composition. The surfactant comprises typically more than 0 to about 1 wt % of the coating/film forming composition.

In some cases, the film forming composition may include at least one buffering composition such as at least one member selected from the group consisting of ammonia, ammonium hydroxide, sodium hydroxide, potassium hydroxide, tetraethanol amine, mixtures thereof, among others. If present, the buffer comprises about 1 to about 10 wt % of the coating/film forming composition. If measurable, the buffering agents normally provide a pH of greater than about 8, e.g., about 8 to about 11 pH.

In other cases, the film forming composition may include one or more wax containing materials such as at least one member selected from the group consisting of paraffinic, microcrystalline, natural waxes, mixtures thereof, among others. If present, the wax comprises about 1 to about 10 wt. % of the coating/film forming composition, e.g., normally about 4 to about 5 wt %. The presence of a wax containing composition increases the adhesion or cohesion of the inventive composition to the underlying substrate thereby enhancing the ability of the composition to shield the substrate from the environment.

The amount of silica and/or a silicate, among other components of the composition can be tailored in order to maximize its corrosion protection of the underlying surface. Typically, the amount of silica will range from about 1 to about 15 wt. %. Any suitable commercially available silica can be employed, e.g, TS610 and TS720 silica supplied by Cabot Corporation. Typically, a treated silica is employed; that is, silica which was treated with at least one of dimethylsilicone (e.g., TS720) and dimethyldichlorosilane (e.g., TS610) thereby altering its hydiophillic nature.

Examples of suitable silicate compounds comprise alkali and alkaline earth silicates such as at least one member selected from the group consisting of calcium silicate, sodium silicate, potassium silicate, mixtures thereof, among others. A specific example of silicate includes sodium silicate supplied by N Grade sodium silicate from PQ Corporation that contains 50 wt. % sodium silicate. While the amount of silica/silicate can be varied, the amount typically ranges from about 0.1 to about 20 wt. %. (Sodium silicate baghouse fines would also work.) The amount of silica, silicate or combined silica/silicate can also depend on the desired time period of protection. For example, if the coating/film is only intended to provide protection for a relatively short period of time, e.g, 7 days, the silica and silicate content will be relatively low, e.g., about 1 to about 5 wt. % silica and about 0.1 to about 2.0 wt. % silicate.

The utility of the inventive film forming composition can be enhanced by adding a colorant or dye. The colorant, therefore, permits a visual determination as to whether or not the tool has been protected from corrosion. While any suitable colorant or dye can be employed, examples of colorants include at least one member selected from the group consisting of inorganic pigments, dyes, mixtures thereof, among others.

The composition can also include any suitable additives which do not adversely affect the utility of the inventive composition. For example, the composition can include an effective amount of sodium nitrite for use as a flash rust inhibitor, e.g., greater than about 0 to about 0.1 wt. %, a defoamer such as BubbleBreaker supplied by WitCo, e.g, about 0.01 to about 0.1 wt % of Foamex 1488 supplied by TegoChemie. A defoamer is particularly useful when mixing and employing an acrylic-based coating/film forming composition. The formulation can also include antioxidant materials such as butylated hydroxytoluene (BHT) or polymeric BHT to inhibit high-temperature oxidation of the carrier. The formulation can also include additives to impact ultraviolet light stability such as Tin UVin by Ciba Geigy.

The instant invention employs a coating/film which forms a relatively thin protective layer, e.g., at least about 1 mil thick. The exact thickness of the protective layer is dependent upon the desired results, e.g., generally a thicker layer provides better corrosion resistance. The coating/film provides a physical barrier from condensation while also supplying a silica/silicate product which provides corrosion-inhibiting properties. Without wishing to be bound by any theory or explanation, it is believed that one manner in which the inventive coating provides improved protection is by maintaining an elevated pH upon or at the underlying metal surface, e.g., an amount silica/silicate effective to provide a pH from about 8 to about 11. Depenpding upon the composition of the metal surface, coating/film composition applied to the surface, temperature and length of time the composition is in contact with the metal surface, at least a portion of the coating can interact with the metal surface. The interaction can produce a mineral-like coating characterized by crystallites within an amorphous matrix. A more detailed description of mineral layers and precursors thereof can be found in the aforementioned copending and commonly assigned U.S. patent applications; the disclosure of which was incorporated by reference.

In one aspect, the inventive coating/film comprises water, a carrier, silica, at least one silicate, surfactants and an optional buffering material and wax. The amount of water can range from about 1 to about 70 wt %; normally about 1 to about 50%, e.g., water can be employed for controlling the viscosity of, for example, linseed oil. The coating/film also includes a carrier such as glycerin, corn oil, sunflower oil, vegetable oil, linseed oil, cedar, canola, castor, olive, mixtures thereof, among others. The amount of carrier within the film forming compositions typically ranges from about 30 to about 80 wt %.

In another aspect of the invention, the coating/film is self-supporting. In this aspect the coating/film composition can be an acrylic or oxidizing oil based. An example of a particularly useful acrylic comprises "Carboset PL 958" supplied by The B.F. Goodrich Company. Silica and a silicate can be combined with the acrylic in any suitable fashion. Commercially available water and/or solvent borne acrylics can be employed in the instant invention. While an acrylic based coating/film can function similar to an oil based system, the acrylic film once cured can be readily peeled or stripped from an underlying surface. By acrylic-based, it is meant that the carrier component of the composition is based upon acrylic polymers, e.g., resins made by polymerization of acrylic acid ($CH_2$=$CCH_2$—COOH), methacrylic acid and their derivatives such as methlacrylate, ethylacrylate, and methacrylate, as well as combinations thereof and copolymers with other monomers. The coating/film can also be removed in situ, e.g., from the tool cavity, when the underlying metal article is being operated for its intended purpose, e.g, when the metal article comprises a plastic molding dye the film is removed by injecting plastic into the mold as is conventional practice in the industry.

Compositions forming a self-supporting film can be employed for any suitable end-use. An example of such an end-use is to protect the exterior surfaces of industrial equipment, and associated conduits and infrastructure. In particular, the self-supporting film is effective at protecting insulated conduits and piping from corrosion. Corrosion under insulation (CUI) typically occurs upon the exterior surface of insulated pipes, e.g., steel, as a result of condensation, a corrosive environment, cyclic operation, among other causes. The inventive self-supporting film can be applied upon the pipe and/or insulation prior to installing the insulation around the pipe. For best results, the self-supporting film is allowed to form prior to installing the insulation.

In a further aspect of the invention, the inventive coating/film has an improved thermal stability in comparison to conventional solvent containing coatings. When the inventive coating/film is substantially solvent as well as oil-free, such reduces, if not eliminates, concerns associated with combustion or flammability. The thermal stability of the inventive coating/film can vary widely, e.g., from about −20 F. to at least about 200 F. The inventive composition can also be substantially VOC free thereby providing an environmentally acceptable product. By "substantially VOC free", it is meant that the coating/film forming composition that is applied upon a metal surface contains less than about 15 wt. % VOCs.

The aforementioned components of the film forming composition can be combined by any suitable method, e.g, by using a conventional mixer. Normally, a sodium silicate solution which is dispersed or introduced slowly to the other components in order to avoid sudden shock and undesired precipitation. When employing an untreated source of silica, silica and a suitable silicate can be combined together at a pH sufficient to permit the untreated silica to become more soluble within the silicate thereby forming an intermediate product. The intermediate product can be combined with the remaining components of the coating/film in any expedient fashion.

The inventive coating/film forming composition can be applied by any conventional method such as by brushing, rolling, pumping, spraying, painting, via an aerosol, among other conventional methods. While any suitable aerosol can be employed, in order to maximize the environmental compatibility of the coating/film it is desirable to employ hydrofluorocarbon propellants such as tetrafluoroethane (HFC-134a), dihaloethanes (HFC-152a), carbon dioxide, hydrocarbons such as propane, isobutane, mixtures thereof, among others. The inventive coating/film can be reapplied, if necessary, to maintain corrosion protection. In some cases, the inventive coating/film can be applied or reapplied to the tool or die when in operation.

The pH of the coating/film can range from about 8 to less than about 11. The pH of the coating/film can be modified by adding any suitable compound such as a nitrate, nitrite, a second silicate, phosphate, mixtures thereof, among other buffering compounds. For example, the pH of the inventive film forming composition can be tailored in order to enhance its storage stability, e.g., increasing the pH of a composition containing linseed oil can increase shelf life. While the shelf life can vary depending upon the surrounding environment and composition, the film forming composition can, for example, in the case of an acrylic based coating/film forming composition remain stable for about 7 to about 14 days. An oil based coating/film forming composition may separate during storage; but, can be remixed as needed by agitation.

Under normal atmospheric conditions, the water based coatings/films of the invention can be tailored so as to not solidify completely and for easy removal. For example, coatings/films containing oil can cure to a tacky consistency or finish. Such a coating/film can be removed by any expedient method such as rinsing the mold with a suitable solvent mixture. Some of the coatings can simply be wiped off with a towel. The coating has been designed to come off with conventional purge materials, or whatever the material molded. The use of solvents will normally remove any coatings. Typical mold cleaners that are being used in the industry, such as "All Citrus Cleaner-Degreaser" by Stoner, will also remove some of these coatings. When the coating/film comprises a self-supporting coating/film, depending upon the film's thickness it can cure sufficient to be stripped from the underlying surface in about 10 min to about 3 hours. While the effectiveness of the coating/film once applied to a surface can vary depending upon the surrounding environment, the inventive film can provide protection for a period ranging from about 7 days to at least about 6 months.

The coating/film can be applied to a virtually unlimited array of metallic surfaces and shapes. The metallic surface can comprise iron, steel, cold rolled steel, stainless steel, copper, lead, brass, zinc, aluminum, magnesium, molybdenum, nickel, tin, cobalt, chromium, vanadium, alloys thereof, among other metals which have no or minimal reaction with the coating/film forming composition. The shape of the surface can possess almost any configuration. The shape of the surface will, however, affect the method that is employed for applying the film forming composition.

While the above Description places particular emphasis upon using the coating/film for protecting a metallic surface, the instant invention can also be employed upon glass, ceramic, wooden, plastic, among other surfaces. If desired, the aforementioned film forming composition can be incorporated into a virtually unlimited array of conventional products for enhancing the corrosion resistance of these conventional products. For example, the film forming composition or an intermediate product thereof can be added to conventional aliphatic hydrocarbon, methylene chloride, mineral oil and stoddard solvent based metal protectants, e.g., RUST VETO or COSMOLINE supplied by E.F. Houghton & Co., Valley Forge, Pa.

The following Examples are provided to illustrate not limit the scope of the invention as defined by the appended claims. In these Examples commercially available materials were employed unless indicated otherwise.

EXAMPLE 1

The following composition was prepared and employed for protecting the surface of commercially available steel test panel measuring 3×5 inches (supplied by ACT Laboratories). The composition was prepared by mixing the components in a blender. The mixed composition was applied to the surface of the steel test panel by using a paint brush.

| AMOUNT | COMPONENT | SUPPLIER |
|---|---|---|
| 50 wt. % | glycerin | Humco |
| 38 wt. % | N grade silicate (liq)* | PQ Corporation |
| 10 wt. % | canola oil | Aldrich Company |
| 1 wt. % | fumed silica | Cabot Corporation |
| <1 wt. % | reagent alcohol | Fischer Scientific |
| 0.01 wt. % | NaNO2 | Fischer Scientific |

*contains 63 wt. % water and 37 wt. % silicate

EXAMPLE 2

The following composition was prepared as described above in Example 1. The mixed composition was applied to the surface of a steel test panel by using the so-called gate method (casting knife) that applied a coating about 1/16 inches in thickness.

| AMOUNT | COMPONENT | SUPPLIER |
|---|---|---|
| 89 wt.% | PL-958 acrylic | B. F. Goodrich |
| 10 wt. % | N-grade sodium silicate | PQ Corp. |
| 0.5–1.0 wt. % | sodium nitrite | Fisher Scientific |

EXAMPLE 3

The following composition was prepared as described above in Example 1. The mixed composition was applied to the surface of a steel test panel by using a draw-down rod that applied a coating about 1.0 mil in thickness.

| AMOUNT | COMPONENT | SUPPLIER |
|---|---|---|
| 44–45 wt. % | Castor oil | Humco |
| 35 wt. % | deionized water | |
| 10 wt. % | linseed oil | TR3 |
| 5 wt. % | N-grade sodium silicate | PQ Corp. |
| 5 wt. % | ammonium hydroxide | Fischer Scientific |
| 0.5 wt. %* | PEMULIN 1621 emulsifier | B. F. Goodrich |

*emulsifier can range from 0.1 to 2.0 wt. %

After the coated panel was allowed to cure between 6 to 12 hrs, the coated panels from Examples 1 through 3 were placed into a humidity chamber and tested in accordance with ASTM D2247.

ASTM Test Results. Example 1/Composition 1 remained within the humidity chamber for 250 hours before the appearance of red rust as determined by visually inspecting the test panels.

ASTM Test Results: Example 2/Composition 2 remained within the humidity chamber for 600 hours.

ASTM Test Results: Example 3/Composition 3 remained within the humidity chamber for 268 hours.

EXAMPLE 4

The following composition was prepared as described above in Example 1. The composition was coated upon a steel test panel and tested in accordance with ASTM D2247.

| AMOUNT | COMPONENT | SUPPLIER |
|---|---|---|
| 44 wt. % | Glycerin | Humco |
| 22 wt. % | Castor oil | Humco |
| 4 wt. % | Linseed oil | TR3 |
| 19 wt. % | N-liquid sodium silicate | PQ Corp. |
| 10 wt. % | EtOH (70% w Na-nitrite .02 mg/ml) | Fischer Scientific |
| 1 wt. % | 610 Cab-o-sil silica | Cabot Corp. |

ASTM Test Results: Example 4/Composition 4 remained within the humidity chamber for 500 hours

EXAMPLE 5

The formulation set forth in Example 3 as well as the following formulation were packaged by Raabe Corporation, Menomonee, Wisconsin, in accordance with conventional packaging methods into an aerosol spray can. These two formulations were packaged with two propellants, one was a hydrocarbon blend comprising propane and butane, and second comprised carbon dioxide. These formulations were also dispensed from a pressurized container in accordance with the so-called "EP" method (EP comprises placing into a bag within the pressurized can). Example 3/Composition 3 was packaged with hydrocarbon as well as the carbon dioxide propellants. Example 5/Composition 5 was packaged with the hydrocarbon propellant and the EP method.

| AMOUNT | COMPONENT | SUPPLIER |
|---|---|---|
| 95 wt. % | canola oil | Wesson |
| 5 wt. % | TS-610 Fumed treated silica | Cabot |
| 0.1 wt. % | N-grade Sodium silicate | PQ |
| 0.01 wt. % | KenReact Lica 12 titanate coupling agent* | Kenrich Petrochemicals, Inc. |

*Titanium 1 V2, 2 (bis 2 propenelatomethyl) butanolato, tris (dioctyl) phosphato-O A coating was spray applied upon bare steel using a 1.0 mil drawdown. The coated panel was exposed to humidity in accordance with ASTM procedure no. D2247, and lasted 288 hrs before the appearance of 5% red rust upon the surface of the test panel.

EXAMPLE 6

The following composition was prepared as described above in Example 1. The mixed composition was applied to the surface of a steel test panel by using a draw-down rod that applied a coating of about 4 mil in thickness.

| AMOUNT | COMPONENT | SUPPLIER |
|---|---|---|
| 89 wt. % | Canola Oil | Wesson |
| 0.1 wt. % | N-grade sodium silicate(liquid) | PQ |
| 0.01 wt. % | KenReact Lica 12 titanate coupling agent | Kenrich Petrochemicals, Inc. |
| 4–5 wt. % | Cab-o-sil 610 silica | Cabot Corp. |
| 4–5 wt. % | paraffinic wax | Bareco-Petrolite |

The corrosion resistance of this composition was tested in accordance with ASTM Test No. B-117. The panels coated with this composition survived for at least 48 hours before the occurrence of 5 percent red rust.

If desired, the previously identified paraffinic/microcrystalline wax or any other suitable wax can be added to each of the previously described formulations for improving the adhesion of the composition to a substrate.

EXAMPLE 7

The following composition was prepared as described above in Example 1. The mixed composition was applied to the surface of a steel test panel by using a draw-down rod that applied a coating about 4 mil in thickness.

| AMOUNT | COMPONENT | SUPPLIER |
|---|---|---|
| 92 wt. % 2:1 ratio | Sunflower/Linseed Oil | Wesson |
| 1.0 wt. % | N-grade sodium silicate(liquid) | PQ |
| 2–3 wt. % | Cab-o-sil silica | Cabot Corp. |
| 4–5 wt. % | paraffinic wax | Bareco-Petrolite |

The corrosion resistance of this composition was tested in accordance with ASTM Test No. B-117. The panels coated with this composition survived for at least 48 hours before the occurrence of 5 percent red rust.

EXAMPLE 8

The following composition was prepared as described above in Example 1. The mixed composition was applied to the surface of a steel test panel by using a draw-down rod that applied a coating about 4 mil in thickness.

| AMOUNT | COMPONENT | SUPPLIER |
|---|---|---|
| 92 wt. % 2:1 | Corn/Linseed Oil | Wesson |
| 1.0 wt. % | N-grade sodium silicate(liquid) | PQ |
| 2–3 wt. % | Cab-o-sil silica | Cabot Corp. |
| 4–5 wt. % | paraffinic wax | Bareco-Petrolite |

The corrosion resistance of this composition was tested in accordance with ASTM Test No. B-117. The panels coated with this composition survived for at least 48 hours before the occurrence of 5 percent red rust. If desired, the ratio of corn/linseed oil can be about 1:1 in order to obtain at least 48 hours in ASTM B-117 testing.

EXAMPLE 9

The formulas set forth in Examples 1 and 5 were modified to include a paraffinic wax, and were prepared as described above in Example 1. The modified formulas have the following composition:

| AMOUNT | COMPONENT | SUPPLIER |
|---|---|---|
| 89 wt. % | Canola Oil | Wesson |
| 5 wt. % | Treated Fumed Silica-Cab-o-Sil 610 | Cabot Corp. |
| 0.1 wt. % | N-grade Sodium Silicate | PQ Corp. |
| 0.1 wt. % | KenReact Lica 12 coupling agent | Kenrich Petrochemicals, Inc. |
| 4–5% | paraffinic wax | Bareco-Petrolite |

-continued

| AMOUNT | COMPONENT | SUPPLIER |
|---|---|---|
| 45 wt. % | glycerin | Humco |
| 38 wt. % | N grade silicate (liq) | PQ Corporation |
| 10 wt. % | canola oil | Aldrich Company |
| 1 wt. % | fumed silica | Cabot Corporation |
| <1 wt. % | reagent alcohol | Fischer Scientific |
| 0.01 wt. % | NaNO2 | Fischer Scientific |
| 4–5 wt. % | paraffinic wax | Bareco-Petrolite |

The corrosion resistance of these compositions were tested in accordance with ASTM Test No. B-117 (salt exposure) by applying the composition onto the surface of steel test panels. The coated panels survived greater than 48 hours before the occurrence of 5 percent red rust.

EXAMPLE 10

The following Example demonstrates that naturally occurring oils are combinable with synthetic oils. This Example also illustrates formation of a coating/film having a relatively fir or self-supporting outer surface and uncured material underlying the outer surface. The following compositions were prepared by using the following method—or in accordance with Example 1 above.

| AMOUNT | COMPONENT | SUPPLIER |
|---|---|---|
| | -COMPOSITION A- | |
| 2:1 ratio | Linseed oil/PAO | ADM/Durasyn 174 Amoco |
| (55–60 wt. % linseed) | | |
| 0.75–1.0 wt. % | calcium silicate-Hubersorb 600 | J. M. Huber |
| 2.0 wt. % | amber wax-Bareco Ultraflex | Bareco-Petrolite |
| 6–8 wt. % | fumed silica-Cabosil 610 | Cabot Corp. |
| | -COMPOSITION B- | |
| 2:1 ratio | Linseed oil/PAO | ADM/Durasyn 174 Amoco |
| (55–60 wt. % linseed) | | |
| 0.75–1.0 wt. % | calcium silicate-Hubersorb 600 | J. M. Huber |
| 5.0 wt. % | amber wax-Bareco Ultraflex | Bareco-Petrolite |
| 6–8 wt. % | fumed silica-Cabosil 610 | Cabot Corp. |

The PAO comprised polymerized 1-decene. These compositions were applied by using a drawdown gate onto an iron test panel. The composition formed a coating/film in about 24 hours by drying under ambient conditions. The characteristics of the coating/film were an outer self-supporting and resilient layer. The portion of the coating/film between the outer layer and test panel remained uncured in a substantially unchanged physical state. When applied to the test panel the coating/film imparted enhanced corrosion resistance to panel, in that the outer layer is water resistant and repellent while the underlying uncured portion inhibits the ability for corrosive materials to attack the panel.

The corrosion resistance of the coating/film was demonstrated in accordance with ASTM Test No. B-117 (salt spray) and D2247 (humidity). Test panels coated, respectively, with compositions A and B were tested together at 500 hrs., 750 hrs., and 1000 as per ASTM B-117. The outer self-supporting layer remained intact, was not penetrated by corrosion material, and remained flexible. The portion of the coating/film under the outer layer remained gel-like after 1,000 hrs of salt exposure. No rust was observed via visual detection after 1,000 hours of ASTM B-117 testing.

Test panels coated, respectively, with Compositions A and B were tested at 1000 hrs as per-ASTM D2247. Results similar to the previous ASTM B-117 were obtained; except that the outer layer was more flexible. No rust was observed via visual detection after 1,000 hours of ASTM D2247 testing.

In addition to corrosion resistance, panels coated with Composition B were evaluated for temperature and pressure resistance. In test two panels were coated with Composition B, allowed to cure for 48 hrs. under ambient conditions and placed into an American Pressure Steam Sterilizer Model No. 25× pressure sterilizer at 240 F and 2× atmospheric pressure for a period of 24 hrs. The only visually detectable affect was an increased darkening of the outer self-supporting layer. The temperature and pressure resistance of a panel coated with Composition B that had undergone 750 hrs. in the ASTM B117 Salt Spray was also evaluated. Similar to the aforementioned results, the only reportable change was a darkening of the outer self-supporting layer.

EXAMPLE 11

The formulation set forth in Example 5 was modified to include polyurethane to produce the following composition:

| AMOUNT | COMPONENT | SUPPLIER |
|---|---|---|
| 85–90 wt. % | canola oil | Wesson |
| 5 wt. % | TS610 fumed silica | Cabot Corp. |
| 0.1–1.0 wt. % | N-grade sodium silicate | PQ |
| 0.01 wt. % | KenReed Lica 12 Titanate coupling agent | Kenrich Petrochemicals, Inc. |
| 3–10 wt. % | polyurethane | Urotuf-Reichold |

EXAMPLE 12

The formulation set forth in Example 6 was modified to include polyurethane to produce the following composition:

| AMOUNT | COMPONENT | SUPPLIER |
|---|---|---|
| 80–85 wt. % | Canola Oil | Wesson |
| 0.1–1.0 wt. % | N-grade sodium silicate | PQ |
| 0.01 wt. % | KenReact Lica 12 titanate coupling agent | Kenrich Petrochemicals, Inc. |
| 4–5 wt. % | Cab-o-sil 610 silica | Cabot Corp. |
| 4–5 wt. % | paraffinic wax | Bareco-Petrolite |
| 3–10 wt. % | polyurethane | Urotuff-Reichold |

The above composition was modified further by substituting an acrylic resin for the polyurethane, e.g., Neocryl acrylic resin supplied by Zeneca Resins. This composition was applied upon an ACT steel panel and tested in accordance with ASTM B117. The panel survived greater than 100 hours before the occurrence of 5% red rust (as measured visually).

EXAMPLE 13

The following Example demonstrates formation of the previously described mineral layer as a result of a component of the corrosion resistant coating/film interacting with the surface of copper substrates. The interaction was detected by using ESCA analysis in accordance with conventional methods.

Analytical conditions for ESCA:

| | |
|---|---|
| Instrument | Physical Electronics Model 5701 LSci |
| X-ray source | Monochromatic aluminum |
| Source power | 350 watts |
| Analysis region | 2 mm × 0.8 mm |
| Exit angle* | 50° |
| Electron acceptance angle | ±7° |
| Charge neutralization | electron flood gun |
| Charge correction | C—(C,H) in C 1s spectra at 284.6 eV |

*Exit angle is defined as the angle between the sample plane and the electron analyzer lens.

Coatings were prepared based on the ingredients shown in the table below. Different base oils and base oil combinations, alkali silicate types, silicate amounts, and substrates were used to represent a cross section of possible ranges. The different base oils, polyalphaolefin and linseed oil, are representative of coatings which fall into the non-drying and drying oil mixture categories. Two types of alkali silicates were also used, sodium and calcium silicate. The concentration of the alkali silicate was also varied from 1% to 50% wt to show the range of possible concentrations. Each set of coatings were applied onto both cold rolled and galvanized steel panels (panels were supplied by ACT Labs).

Each formulation was mixed together and applied onto the given substrate at a thickness between 5 and 10 mils. The coatings were allowed to set for at least 24 hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

Formulations used for ESCA analysis on galvanized panels

| Sample # | 1 | 2 | 3 | 4 | 5 | 6 | 7 | 8 |
|---|---|---|---|---|---|---|---|---|
| Durasyn 174 wt. % | 49.3 | 44.3 | 49.3 | 44.3 | 87 | 79.2 | 70.4 | 44 |
| Linseed Oil | 49 | 44 | 49 | 44 | 0 | 0 | 0 | 0 |
| Fumed Silica wt. % | 0.7 | 0.7 | 0.7 | 0.7 | 12 | 10.8 | 9.6 | 6 |
| Sodium silicate wt. % | 1 | 10 | 0 | 0 | 0 | 0 | 20 | 50 |
| Calcium silicate wt. % | 0 | 0 | 1 | 10 | 1 | 10 | 0 | 0 |

ESCA was used to analyze the surface of each of the substrates. ESCA detects the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2p) binding energy (BE) in the low 102 eV range, typically between 102.1 to 102.3. The silica can be seen by Si(2p) BE between 103.3 to 103.6 eV. Higher binding energies (>103.8 eV) indicate precipitated silica due to the charging effect of the silica which has no chemical affinity to the surface. The resulting spectra show overlapping peaks, upon deconvolution reveal binding energies in the ranges representative of metal silicate and silica.

What is claimed is:

1. A composition comprising a combination comprising at least one synethetic oil and at least one biodegradable oil selected from the group consisting of castor oil, canola oil, sunflower oil, linseed oil, corn oil and soybean oil; at least one silicate, and at least one wax selected from the group consisting of paraffinic, microcrystalline and amber.

2. A composition comprising soybean oil, at least one silicate, at least one wax and silica.

3. A composition for use in reducing corrosion of a metallic surface obtained by combining at least one non-toxic oil, at least one synthetic oil, silica; and at least one wax selected from the group consisting of paraffinic, microcrystalline and amber.

4. A method for reducing corrosion of a metallic surface comprising applying the film forming composition of claim 1, 2 or 3 upon the metallic surface.

5. The composition of claim 1 wherein said biodegradable oil comprises at least one member selected from the group consisting of glycerin, canola oil, corn oil, sunflower, castor oil, soybean and linseed oil.

6. The composition of claim 1 wherein the biodegradable oil comprises soybean oil.

7. The composition of claim 1 wherein the silicate comprises sodium silicate.

8. The composition of claim 1 wherein the composition is substantially free of V.O.C.s.

9. The composition of claim 1 wherein said wax comprises microcrystalline wax.

10. The composition of claim 1, 2 or 3 wherein said composition is combined with a propellant comprising at least one member selected from the group consisting of carbon dioxide, butane, propanes and acetone thereby forming a sprayable mixture.

11. The composition of claim 3 wherein the at least one synthetic oil comprises at least one member selected from the group consisting of polybutene, phosphate ester and polyalphaolefin.

12. A coating composition for use in reducing corrosion of a metallic surface, said composition comprising: a carrier medium capable of forming a coating upon a metallic surface; a corrosion inhibiting amount of a corrosion inhibitor wherein said inhibitor comprises at least one of silica and silicate; at least one surfactant; at least one wax selected from the group consisting of paraffinic, microcrystalline and amber; and wherein the carrier medium comprises at least one non-toxic oil and at least one synthetic oil.

13. The composition of claim 2 wherein said at least one wax comprises at least one member selected from the group consisting of paraffinic, microcrystalline and amber.

14. A corrosion resistant article of manufacture comprising a substrate having a metallic surface wherein said metallic surface is coated with a composition of any one of claims 1, 2 or 3.

15. The composition of claim 3 wherein the at least one non-toxic oil comprises soybean oil, the at least one synthetic oil comprises polybutene and the at least one wax comprises microcrystalline wax.

16. The composition of claim 3 wherein the at least one synthetic oil comprises phosphate ester and polybutene.

17. A composition comprising at least one synthetic oil and biodegradable oil selected from the group consisting of castor oil, canola oil, sunflower oil, linseed oil, corn oil and soybean oil; at least one silicate, at least one wax and at least one propellant selected from the group consisting of carbon dioxide, butane, propanes and acetone; and combinations thereof.

18. The composition of claim 3 further comprising at least one phosphate ester.

19. The composition of claim 3 further comprising at least one member selected from the group consisting of dyes, defoamers, buffering agents, thickeners, and surfactants.

20. The composition of claim 1 wherein tho composition has a basic pH.

21. The article of claim 14 wherein the metallic surface comprises at least one member selected from the group consisting of iron, steel, cold rolled steel, stainless steel, copper, lead, brass, zinc, aluminum, magnesium, molybdenum, nickel, tin, cobalt, chromium, vanadium; and combinations thereof.

22. The composition of claim 1 further comprising at least one member selected from the group of sodium nitrate and titanate coupling agents.

* * * * *